US010721484B2

(12) United States Patent
Le Leannec et al.

(10) Patent No.: US 10,721,484 B2
(45) Date of Patent: Jul. 21, 2020

(54) DETERMINATION OF A CO-LOCATED LUMINANCE SAMPLE OF A COLOR COMPONENT SAMPLE, FOR HDR CODING/DECODING

(71) Applicant: InterDigital VC Holdings, Inc., Wilmington, DE (US)

(72) Inventors: Fabrice Le Leannec, Mouaze (FR); Sebastien Lasserre, Thorigné Fouillard (FR); Edouard Francois, Bourg des Comptes (FR); Franck Galpin, Thorigne-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 275 days.

(21) Appl. No.: 15/761,100

(22) PCT Filed: Sep. 19, 2016

(86) PCT No.: PCT/EP2016/072101
§ 371 (c)(1),
(2) Date: Mar. 18, 2018

(87) PCT Pub. No.: WO2017/046408
PCT Pub. Date: Mar. 23, 2017

(65) Prior Publication Data
US 2018/0270490 A1    Sep. 20, 2018

(30) Foreign Application Priority Data
Sep. 18, 2015  (EP) .................................... 15290234

(51) Int. Cl.
*H04N 19/186*  (2014.01)
*G06T 9/00*  (2006.01)
(Continued)

(52) U.S. Cl.
CPC ........... *H04N 19/186* (2014.11); *G06T 5/009* (2013.01); *G06T 9/00* (2013.01); *H04N 19/59* (2014.11)

(58) Field of Classification Search
CPC ......... G06T 5/009; G06T 9/00; H04N 19/186; H04N 19/59; H04N 19/117; H04N 19/182;
(Continued)

(56) References Cited

U.S. PATENT DOCUMENTS

2008/0175495 A1    7/2008  Segall
2015/0215634 A1*   7/2015  Jia .......................... H04N 19/169
                                                          375/240.03
(Continued)

FOREIGN PATENT DOCUMENTS

WO    WO2012122426    9/2012
WO    WO2016120209    8/2016
(Continued)

OTHER PUBLICATIONS

Anonymous, "Reference ssoftware for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, pp. 1-12.
(Continued)

*Primary Examiner* — Mekonen T Bekele
(74) *Attorney, Agent, or Firm* — Invention Mine LLC

(57) ABSTRACT

A method for determining a luminance value used to process color samples in a decoder or encoder is provided comprising determining (33, 44) a luminance sample associated with a chroma sample position in a common space; and applying (34, 492) the determined luminance sample in a process that
(Continued)

depends on luminance that is being applied to the chroma sample.

11 Claims, 4 Drawing Sheets

(51) Int. Cl.
*H04N 19/59* (2014.01)
*G06T 5/00* (2006.01)

(58) Field of Classification Search
CPC ........ H04N 19/80; H04N 19/85; H04N 19/86; H04N 19/98; H04N 5/20; H04N 9/67; H04N 9/68; G09G 5/02; G09G 5/10; G09G 2340/0428
See application file for complete search history.

(56) References Cited

U.S. PATENT DOCUMENTS

| | | | |
|---|---|---|---|
| 2015/0256807 A1* | 9/2015 | Honji | H04N 9/77 348/453 |
| 2015/0326863 A1* | 11/2015 | Francois | H04N 19/176 375/240.24 |
| 2016/0037044 A1* | 2/2016 | Motta | H04N 9/045 348/221.1 |
| 2016/0337668 A1* | 11/2016 | Le Leannec | H04N 19/96 |
| 2016/0360212 A1* | 12/2016 | Dai | H04N 19/186 |
| 2017/0085889 A1* | 3/2017 | Baylon | H04N 19/124 |
| 2017/0171565 A1* | 6/2017 | Le Leannec | H04N 19/50 |
| 2018/0098094 A1* | 4/2018 | Wen | H04N 19/46 |
| 2019/0082186 A1* | 3/2019 | Van Der Vleuten | H04N 19/59 |

FOREIGN PATENT DOCUMENTS

| | | |
|---|---|---|
| WO | WO2016120330 | 8/2016 |
| WO | WO2017032646 | 3/2017 |

OTHER PUBLICATIONS

Anonymous, "CIE 1931 color space", Wikipedia—the free encyclopedia, https://en.wikipedia.org/wiki/CIE_1931_color_space, Jan. 7, 2018, pp. 1-13.

Lasserre et al., "Technicolor's response to CfE for HDR and WCG (Catagory 1)—Single Layer HDR video coding with SDR backward compatibility", International Organisation for Standardisation, Coding of Motion Pictures and Audio, ISO/IEC JTC1/SC29/WG11 MPEG 2014/M36263, Warsaw, Poland, Jun. 2015, pp. 1-20.

Baylon et al., Response to Call for Evidence for HDR and WCG Video Coding: Arris, Dolby and InterDigital, International Organisation for Standardization, ISO/IEC JTC1/SC29/WG11, Coding of Moving Pictures and Audio, ISO/IEC JTC1/SC29/WG11 MPEG2015/M36264, Warsaw, Poland, Jun. 2015, pp. 1-9.

Pascale, D., "A Review of RGB Color Spaces", The BabelColor Company, Oct. 6, 2003, pp. 1-35.

Anonymous, "High Dynamic Range Electro-Optical Transfer Function of Mastering Reference Displays", Society of Motion Picture and Television Engineers, SMPTE ST 2084:201X Standard, Version 1.24, Jun. 18, 2014, pp. 1-14.

Anonymous, "High-Performance Single Layer Directly Standard Dynamic Range (SDR) Compatible High Dynamic Range (HDR) System for use in Consumer Electronics devices (SL-HDR1)", European Telecommunications Standards Institute, Standard ETSI TS 103 433 v1.1.1, Aug. 2018, pp. 1-84.

Anonymous, "Parameters values for ultra-high definition television systems for production and international programme exchange", International Telecommunication Union, ITU-R Radiocommunication Sector of ITU, Recommendation ITU-R BT.2020-1, Jun. 2014, pp. 1-8.

* cited by examiner

DETERMINATION OF A CO-LOCATED LUMINANCE SAMPLE OF A COLOR COMPONENT SAMPLE, FOR HDR CODING/DECODING

This application claims the benefit, under 35 U.S.C. § 365 of International Application PCT/EP2016/072101, filed Sep. 19, 2016, which was published in accordance with PCT Article 21(2) on Mar. 23, 2017, in English, and which claims the benefit of European Patent Application No. 15290234.2, filed Sep. 18, 2015.

TECHNICAL FIELD

The present disclosure relates generally to video encoding and/or decoding, and more particularly to video encoding and/or decoding using color spacing.

BACKGROUND

In digital signal processing, data compression has become extremely important in the transmission of data. The process of reducing the size of a data file is referred to as data compression. Compression is useful because it helps reduce resource usage, such as data storage space or transmission capacity. However, once the data is compressed, it has to then become decompressed for it to become usable. Because compressed data must be decompressed to use, this extra processing imposes computational or other costs through decompression. In addition, the design of data compression schemes involves trade-offs among various factors, including the degree of compression, the amount of distortion introduced (when using lossy data compression), and the computational resources required to compress and decompress the data. For instance, a compression scheme for video may require expensive hardware for the video to be decompressed fast enough to be viewed as it is being decompressed. The option to decompress the video in full before watching it may be inconvenient or require additional storage.

In video compression, this trade off can become a very important consideration because uncompressed video requires a very high data rate. Most video compression algorithms combine spatial image compression and temporal motion compensation. In addition, video compression streams also accompany audio streams in one package. Therefore, in the design of most video coding standards, the primary goal is aimed at having the highest coding efficiency. Coding efficiency is the ability to encode video at the lowest possible bit rate while maintaining a certain level of video quality. The tradeoff between the video quality and bit rate has posed many practical challenges in recent years.

High Efficiency Video Coding (hereinafter HEVC) is a video compression standard, that has gained popularity. The reason for this popularity is that HEVC can double the data compression ratio compared at the same level of video quality. HEVC supports a number of techniques such as color spacing, scalable coding extensions, and multi-view extensions. Moreover, the HEVC video compression standard specifies, among others, a video decoding process that operates according to a so-called conformance point. The conformance point corresponds to the point, in a video decoding and rendering process, where the conformance of a decoded video sequence with the HEVC standard can be checked. It corresponds to the fixed point in number output of the video decoder, before any subsequent operations apply to the decoded picture components. However, using these capabilities simultaneously have not been possible in most cases. Therefore, a technique is desirable that can take full advantage of some of these capabilities simultaneously.

Other techniques have been proposed to encode and decode picture/video, especially high-dynamic range picture/video.

FIG. 1 is a block diagram depicting a conventional high dynamic range (hereinafter HDR) decoding workflow. In most HDR imaging techniques, imaging and photography is used to reproduce a greater dynamic range of luminosity than is possible with standard digital imaging or photographic techniques. The technique produces superior images that have to be maintained during video and image transmissions. To this end, as shown in FIG. 1, a general HDR reconstruction system (HDR reconstruction 12, color up-sampling 13, HDR post-processing 14) is disposed after a legacy (HEVC) video decoder 11, which aims at reconstructing HDR content from the decoded video sequence produced by the HEVC decoder. In most video distribution use cases, the HEVC coded sequences are represented in 4:2:0 chroma format, and component samples are represented by 10 bits fixed point numbers.

HDR images can be computer renderings and images resulting from merging multiple low-dynamic-range (LDR) or standard-dynamic-range (SDR) photographs. In addition, HDR images can also be acquired using special image sensors, like an oversampled binary image sensor. In the context of the distribution of a compressed HDR video, when also distributing an associated SDR video representative of the HDR with a more limited dynamic range simultaneously, there are several challenges. These challenges are aggravated in cases where there are no SDR associated video and, as a consequence, the generation of the SDR video is also part of the problem to be resolved.

Referring back to FIG. 1, a decoder that can be used with HEVC coded sequences, and one that especially uses HDR imaging, must have a profile that allows for a bit depth of 8-bits to 10-bits per sample with 4:2:0 chroma sampling. Such HEVC decoders must be capable of decoding bitstream made with a higher bit depth that allows for a greater number of colors and accommodate a higher bit depth to allow for a smoother transition of color which minimizes the problem of color banding. In the example used in FIG. 1, a large part of the HDR reconstruction process is performed in 4:4:4 format, whereas the color format classically used in the HEVC coding/decoding process is 4:2:0. The result is high computational complexity of the HDR reconstruction process.

Moreover, the HEVC video compression standard specifies, among others, a video decoding process that operates according to a so-called conformance point. The conformance point corresponds to the point, in a video decoding and rendering process, where the conformance of a decoded video sequence with the HEVC standard can be checked. It corresponds to the fixed point number output of the video decoder, before any subsequent operations apply to the decoded picture components (like chroma up-sampling, color space conversion and/or video signal adaptation to the output display). A conformance point that may be considered by the Moving Picture Expert Group (hereinafter MPEG) standardization body for MPEG/HDR video compression is located just before the 4:2:0 to 4:4:4 chroma up-sampling.

In addition, European Patent Application no 15290214.4 filed on Aug. 24, 2015 discloses picture/video encoding and decoding techniques, enabling the encoding and decoding of high-dynamic range picture/video. Such techniques rely, on the encoder side, on mapping, for example, an HDR picture onto a SDR picture represented in a format compatible with the legacy SDR workflow. Exemplary, the format may be the 8-bit YUV format dedicated to High Definition TV (as defined by the standard ITU-R Rec BT.709) or the 10-bit YUV format dedicated to Ultra High Definition TV (as defined by the standard ITU-R Rec BT.2020). It further comprises encoding the obtained SDR picture by using a legacy SDR image coder. For instance, the coder may be the standard 8-bit h264/AVC main profile or the standard 10-bit HEVC main profile of, e.g., HEVC (or any other codec workable by the workflow). Further, the distribution scheme comprises distributing the bit-stream of the obtained encoded SDR picture. On the decoder side, two scenarios are possible depending on the addressed user. In a first scenario, a decoded SDR picture is obtained from the distributed bit-stream and is displayed on a SDR-capable device. In a second scenario, a decoded HDR picture is obtained from the distributed bit-stream by first obtaining a decoded SDR picture and by second applying a mapping from the decoded SDR picture to the decoded HDR picture.

According to this technique implementing a HEVC decoder, most of SDR-to-HDR mapping process is applied on the decoded color pictures with a 4:4:4 chroma format, due to the use of the XYZ color space, not adapted to perform 4:2:0 to 4:4:4 up-sampling at the beginning on the mapping process. The result is a high computational complexity decoder.

It would thus be desirable to have an HDR decoding process where most of the process is performed in 4:2:0 domain. Moreover, it would be desirable to have an HDR decoding process where the output of the decoding is represented with 10-bit integer samples, so that the HDR decoding process produces an HDR signal that conforms to an established standard HDR video signal.

SUMMARY

Additional features and advantages are realized through the techniques of the present principles. Other embodiments and aspects of the principles are described in detail herein and are considered as part of the claims. For a better understanding of the principles with advantages and features, refer to the description and to the drawings.

A method for determining a luminance value used to process color samples in a decoder or encoder is provided comprising determining a luminance sample associated with a chroma sample position in a space commonly used in all concerned coding/decoding steps; and employing the determined luminance sample in a process that depends on luminance that is being applied to the chroma sample.

BRIEF DESCRIPTION OF THE DRAWINGS

The principles will be better understood and illustrated by means of the following embodiment and execution examples, in no way limitative, with reference to the appended figures on which.

Wherever possible, the same reference numerals will be used throughout the figures to refer to the same or like parts.

DESCRIPTION

It is to be understood that the figures and descriptions of the present principles have been simplified to illustrate elements that are relevant for a clear understanding of the present principles, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications.

The present principles are to provide a method for determining a luminance value used to process color samples in a decoder or in an encoder comprising determining a luminance sample associated with a chroma sample position in a common space; and applying the determined luminance sample in a process that depends on luminance that is being applied to the chroma sample.

According to at least one embodiment, the disclosure provides an HDR encoding or decoding process where most of the process is performed in 4:2:0 chroma format.

In addition, according to at least one embodiment, the disclosure provides an HDR encoding or decoding process where the input of the encoding and the output of the decoding is represented with 10-bit integer samples.

Figure 2:
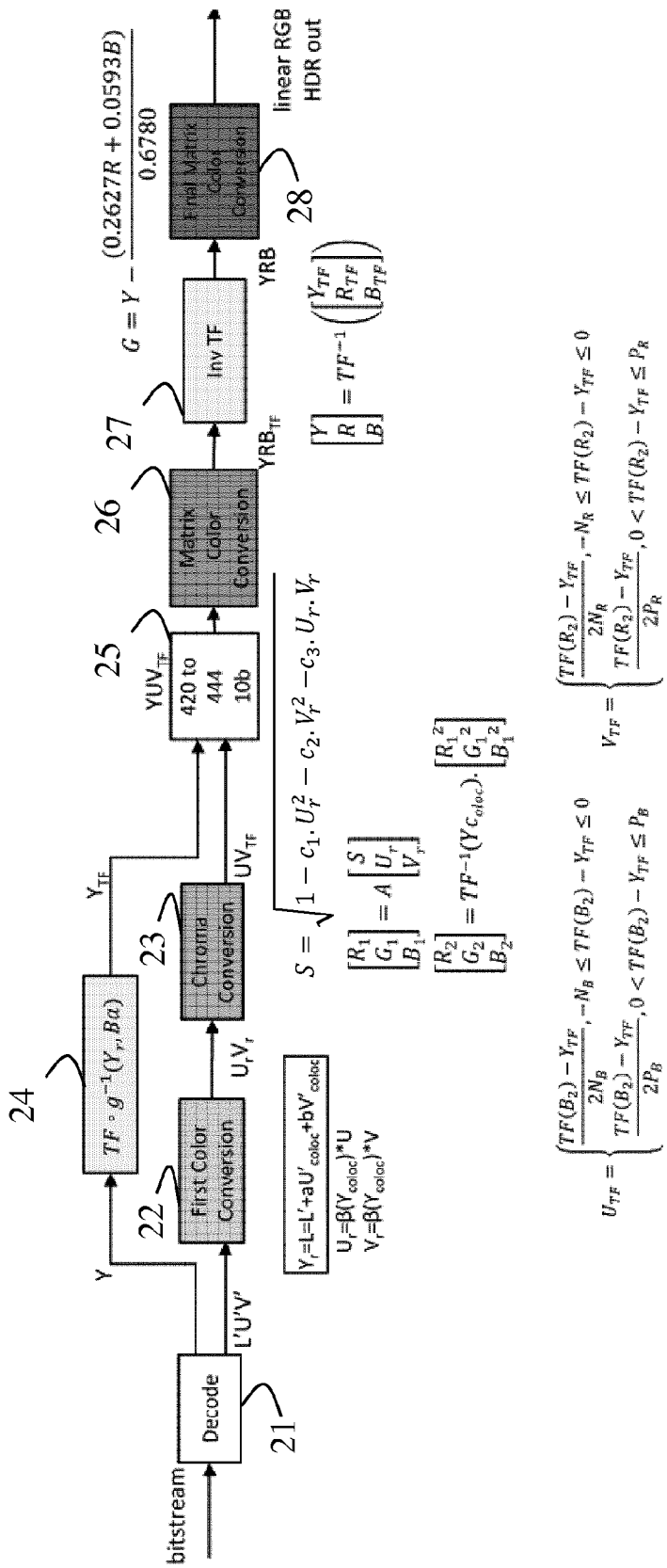
FIG. 2 is a flow diagram depicting a decoding technique using a color spacing scheme in accordance with an example of the present principles.

FIG. 2 illustrates an example of a decoding in which the main steps of decoding and reconstructing HDR pictures are performed in the 4:2:0 format. For instance, the decoder shown in FIG. 2 performs color up-sampling in the YCbCr constant luminance BT2020 color space, computed based on non-linear (R,G,B) color samples obtained through a standard ST2084 transfer function TF, such as the EOTF disclosed in "FCD SMPTE Standard High Dynamic Range Electro-Optical Transfer Function of Mastering Reference Displays, SMPTE ST2084:201X, Version 1.24, of 2014 Jun. 18.

Figure 3:
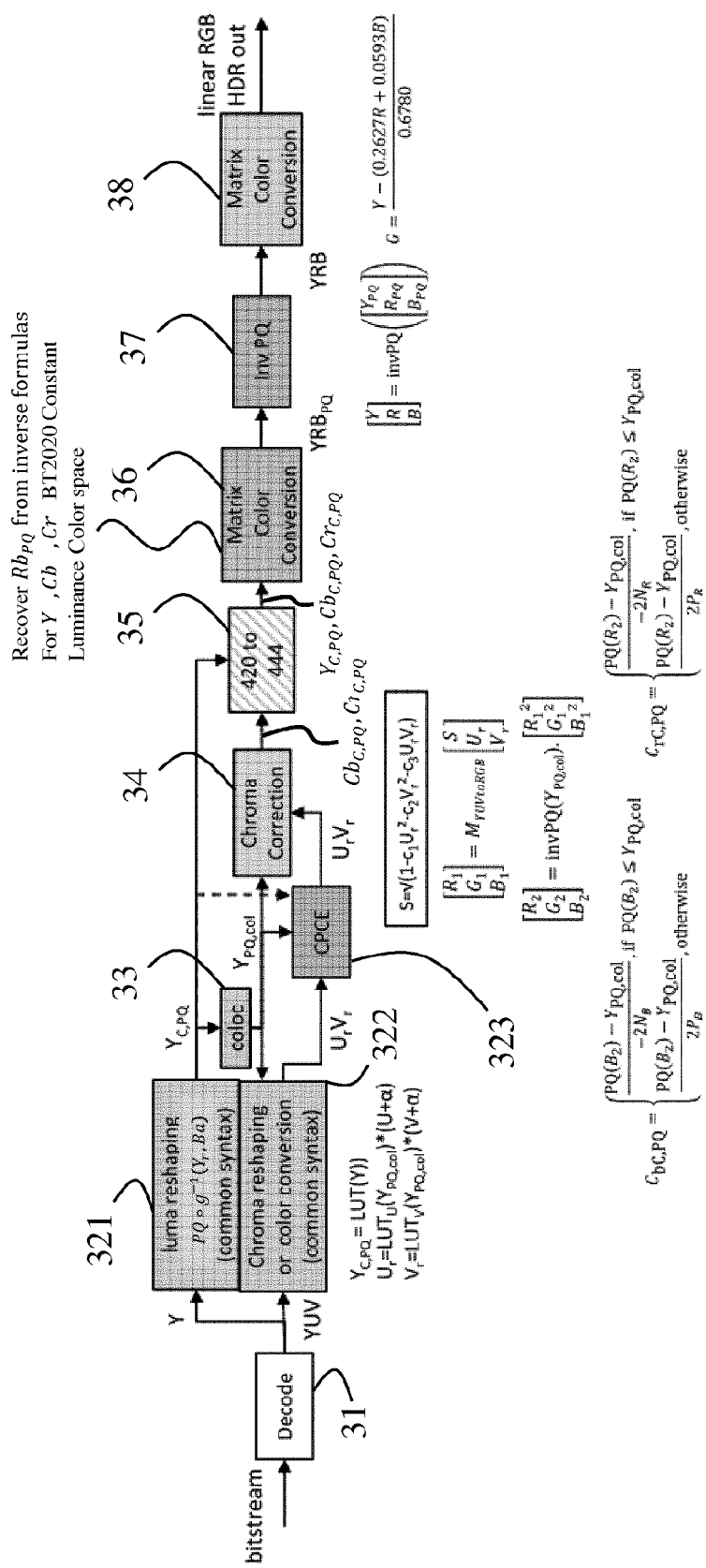
FIG. 3 is block diagram depicting a decoder having a synchronous co-locator in accordance with an example of the present principles.
Figure 4:
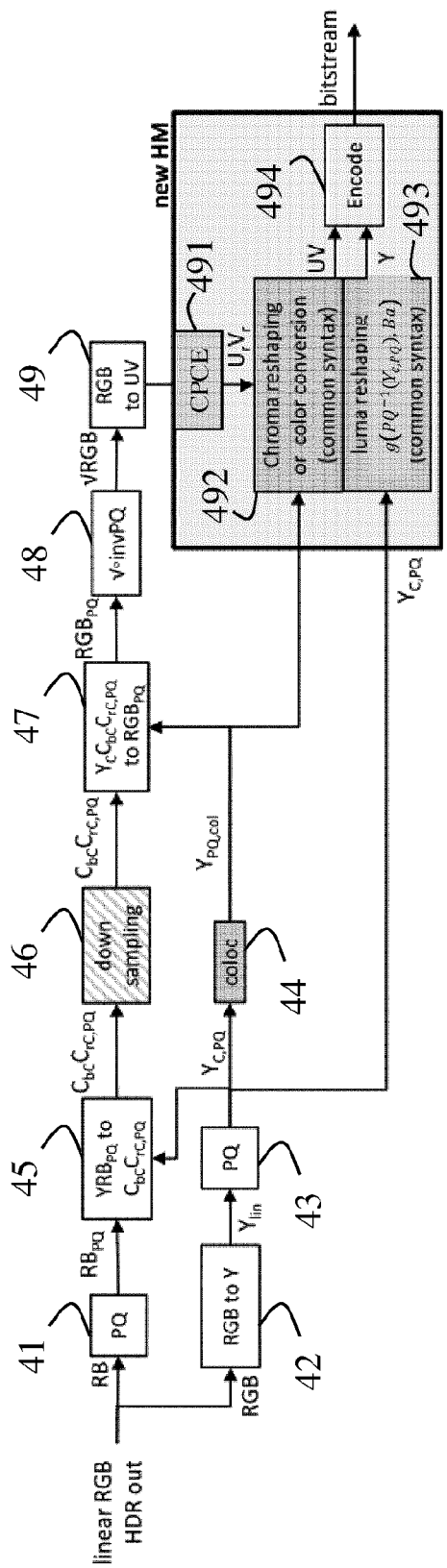
FIG. 4 is a block diagram showing an encoding technique with reshaping features in accordance with an example of the present principles.

Moreover, to ensure good HDR compression efficiency, an HDR encoding process where chroma down-sampling can be performed in a synchronous way with the decoder is proposed. This is provided in the blocks diagrams as depicted in FIGS. 3 and 4, respectively for the decoder and the encoder.

For example, the decoding technique illustrated in FIG. 2 aims at reconstructing at least one linear RGB HDR picture from an input HDR bitstream.

In step 21, the input HDR bitstream is decoded into (L', U', V') luma and chroma samples representative of the SDR content. The decoding is for example compliant with the HEVC video coding standard. Two successive color conversion steps are then applied on the HEVC-decoded 4:2:0 10 bits pictures.

The first color conversion step 22 is applied on at least one decoded picture given by the HEVC decoder (step 21) (or by another processing stage that operates after the HEVC decoding) in the YCbCr color space used for the HEVC coding/decoding. It aims at modifying the color components while keeping the SDR dynamic. The output of the first color conversion step 22 is a reconstructed picture, or picture sample, with the luminance and chroma samples ($Y_r$, $U_r$, $V_r$) obtained through the following equations:

$$U_r = \beta(Y_{coloc}) \times U'$$

$$V_r = \beta(Y_{coloc}) \times V'$$

with $\beta(Y_{coloc})$ a non linear function.

For example, the value of $\beta$ as function of Y can be defined in a look-up table (LUT), such as specified in annex C.2.3 of the standard "ETSI TS 103 433" (located at http://www.etsi.org/deliver/etsi_ts/103400_103499/103433/01.01.01_60/ts_103433v010101p.pdf.

In the above equations, $Y_{coloc}$ corresponds to a luminance sample value L deduced from the full resolution luminance sample Y, and which aims at providing a luminance value at spatial position corresponding to currently considered U' and V' chrominance samples. The determination of $Y_{coloc}$ typically corresponds to a spatial interpolation process between two or four luminance samples located close to current (U', V') sample position. For instance, this can be a bi-linear or bi-cubic interpolation.

According to a simpler, faster variant, the co-located sample $Y_{coloc}$ of a given (U',V') sample position may be chosen as the top-left nearest neighbor luminance sample of (U',V') in terms of spatial position, avoiding the linear combinations involved in an interpolation process.

$Y_r$ is the luma value provided by the video (HEVC) decoder, after an optional luminance sample correction.

If a preliminary luminance sample correction is implemented (optional step), $Y_r$ can be determined as:

$$Y_r = L' + a \cdot U'_{coloc} + b V'_{coloc}$$

with a and b constant values. For example, values a and b are comprised between 0 et 0.5, included. Values between these values may be chosen, with a steps of 1/1638 between 2 successive values.

In this case, the co-located $U'_{coloc}$ and $V'_{coloc}$ chroma samples have to be determined for each corrected luminance sample L'. Again, the co-located ($U'_{coloc}$, $V'_{coloc}$) samples of a given luminance sample $Y_r$, may consist in an interpolated value respectively between several U' and V' samples that surround current L' sample in terms of spatial position.

According to a simpler, faster variant, the top-left nearest (U',V') samples may be chosen as the co-located samples of a given luminance sample L'.

According to a variant, $Y_r$ can be determined as:

$$Y_r = \max(0, L' + a \cdot U'_{coloc} + b V'_{coloc})$$

The second color conversion step 23, or chroma conversion step, is applied on the two reconstructed chroma samples $U_r$, $V_r$, with a reduced resolution because it is performed in the 4:2:0 10 bits domain. The chroma conversion step 23 outputs the chroma samples $U_{TF}$, $V_{TF}$ computed from non-linear (R,G,B) color samples obtained through the transfer function TF, defined such as:

$$S = \sqrt{1 - c_1 \cdot U_r^2 - c_2 \cdot V_r^2 - c_3 \cdot U_r \cdot V_r}$$

$$\begin{bmatrix} R_1 \\ G_1 \\ B_1 \end{bmatrix} = A \begin{bmatrix} S \\ U_r \\ V_r \end{bmatrix}$$

-continued $$\begin{bmatrix} R_2 \\ G_2 \\ B_2 \end{bmatrix} = TF^{-1}(Y_{coloc}) \cdot \begin{bmatrix} R_1^2 \\ G_1^2 \\ B_1^2 \end{bmatrix}$$

$$\begin{bmatrix} U_{TF} \\ V_{TF} \end{bmatrix} = M \cdot \left( \begin{bmatrix} Y_{TF} \\ TF(R_2) \\ TF(B_2) \end{bmatrix} \right)$$

with:
A: a conversion matrix from the YUV color space to the RGB color space,
$c_1$, $c_2$, $c_3$: three constants, and
M stands for linear operations applied onto $Y_{TF}$, as specified in ITU-R BT2020 specification:

$$U_{TF} = \begin{cases} \dfrac{TF(B_2) - Y_{TF}}{2N_B}, & -N_B \leq TF(B_2) - Y_{TF} \leq 0 \\ \dfrac{TF(B_2) - Y_{TF}}{2P_B}, & 0 < TF(B_2) - Y_{TF} \leq P_B \end{cases}$$

$$V_{TF} = \begin{cases} \dfrac{TF(R_2) - Y_{TF}}{2N_R}, & -N_R \leq TF(R_2) - Y_{TF} \leq 0 \\ \dfrac{TF(R_2) - Y_{TF}}{2P_R}, & 0 < TF(R_2) - Y_{TF} \leq P_R \end{cases}$$

with $P_B = 0.7910$, $N_B = -0.9702$, $P_R = 0.4969$, $N_R = -0.8591$.

$c_1$, $c_2$, $c_3$: may be, for example, respectively equal to (−0.27372, −0.68402, −0.12562), if the color space in which (L',U',V') are contained is ITU-R BT709. $c_1$, $c_2$, $c_3$: may be, for example, respectively equal to (−0.22826, −0.79256, −0.12749), if the color space in which (L',U',V') are contained is ITU-R BT709.

Moreover, the luma component of the decoded picture is processed step 24 in a separate channel, in order to be represented with the help of the standard transfer function TF:

$$Y_{TF} = TF \circ g^{-1}(Y_r, Ba)$$

where $Y_r$ is the luma value provided by the video (HEVC) decoder, possibly after correction, and $g^{-1}(Y_r, Ba)$ is the inverse of the non-linearity that was applied on the luminance on the encoder side.

Chroma upsampling step 25 from the format 4:2:0 to 4:4:4 is then applied to the components $Y_{TF}$, $U_{TF}$, $V_{TF}$.

The remaining operations performed after the chroma up-sampling step 25 are the following:

Matrix color conversion step 26 and inverse transfer step 27:
These steps enable the retrieval of the non-linear $R_{TF}$ and $B_{TF}$ component samples of the non-linear RGB color space, by applying the inverse of the $U_{TF}$ and $V_{TF}$ component computation.

The outputs of the matrix color conversion step 26 are the components $Y_{TF}$, $R_{TF}$, $B_{TF}$, and the outputs of the inverse transfer step 27 are Y,R,B, such as:

$$\begin{bmatrix} Y \\ R \\ B \end{bmatrix} = TF^{-1} \left( \begin{bmatrix} Y_{TF} \\ R_{TF} \\ B_{TF} \end{bmatrix} \right)$$

Final matrix color correction 28:

This step enables the retrieval of the linear G component as a function of linear-light luminance Y, linear-light R and linear-light B, according to their relationship defined in the ITU-R BT2020 specification:

$$G=Y-(0.2627R+0.0593B)/0.6780.$$

The matrix color conversion 26, inverse transfer step 27 and final matrix color conversion 28, implemented after the chroma up-sampling 25, are usual when a standard Video Usability Information (VUI, defined in the HEVC standard specification) is considered, like the YCbCr constant luminance BT2020 color space, with the standard ST2084 transfer function. As a consequence, there is no need to define a specific SEI message that would specify the format of the decoded video signal that undergoes 4:2:0 to 4:4:4 chroma up-sampling.

The output of the final matrix color conversion 28 is at least one linear RGB HDR sample.

Looking at FIG. 2, the decoder shown is non-synchronous in terms of co-located luminance sample management, in that various decoding operations involve some operation that are applied on chroma component samples, and which depend on a luminance sample value associated with these chroma component samples. When a picture is represented in a 4:2:0 color space made of a luminance and two chrominance components, the two color components (Cb, Cr) have a spatial size that is half the size of the luminance component both in width and height. Therefore, when modifying a (Cb,Cr) sample, one has to retrieve the luminance value that spatially corresponds to this chroma sample. A so-called 'co-located' luminance or luma sample is then considered, which is derived as a function of the luma sample that are spatially located around the considered chroma sample. However, in the HDR decoding system presented in FIG. 2, the co-located luminance sample is determine in a color space that varies, according to the coding or decoding stage. This leads to non-optimal HDR compression performances.

In one embodiment, the problem may be resolved by the HDR coding/decoding schemes as shown in FIG. 3 and in FIG. 4. The HDR decoder and encoder schemes of FIGS. 3 and 4 reduce the artefacts issued from such desynchronized co-located luminance sample determination.

In particular, the decoder and encoder illustrated in FIGS. 3 and 4 both work within the same color space to perform chroma up and down-sampling, like the YCbCr constant luminance BT2020 color space. The up-sampling from the format 4:2:0 to 4:4:4 is well suited to this specific color space, enabling the decoding process to be mainly implemented in the 4:2:0 format.

However, other color spaces can also be used.

In addition, in the embodiments illustrated in FIGS. 3 and 4, there is no need to define co-located chrominance samples $U_{coloc}$ and $V_{coloc}$. Only a co-located luminance sample $Y_{coloc}$ need to be define. According to these embodiments, the co-located luminance sample $Y_{coloc}$ can be determined in the same color space at the encoding side and at the decoding side.

The decoder of FIG. 3, in one embodiment, provides a co-located luminance sample that is associated with a given color sample. This sample is contained in a down-sampled color component and the process is performed in the same domain, whatever the luminance-dependant operation applied on the considered color sample.

In this embodiment, the embodiment of FIG. 4 consists in a HDR video encoding scheme where color down-sampling is performed before the HDR-to-SDR mapping process, in the same space as the color space used to perform chroma up-sampling on the decoder side.

Taken FIGS. 3 and 4 together, in one embodiment, a method for determining a luminance value is used to process color samples in a decoder/encoder scheme. In this embodiment, first a luminance sample is determined that is associated with a chroma sample position in a common space. Subsequently, the determined luminance sample is applied in a process that depends on luminance that is being applied to the chroma samples. In one embodiment, the common space can include a non-linear luminance space as shown that is obtained when applying a standard transfer function. In addition, the standard transfer function comprises a SMPTE ST2084 inverse electro-optical transfer function (EOTF), also called PQ, can be accommodated.

In one embodiment, a luminance sample can be determined by calculating an average value of non-linear pixel values located close to the chroma sample.

In order to provide a co-located luminance sample that is associated with a given color sample, the decoding method according to at least one embodiment comprises the following steps, illustrated in FIG. 3.

Once again, we consider that the decoder performs color up-sampling in the YCbCr constant luminance BT2020 color space, computed based on non-linear (R,G,B) color samples obtained through a standard ST2084 transfer function TF, such as the EOTF. However, other color space or other transfer function could be considered.

In step 31, the input HDR bitstream is decoded into (Y, U, V) luma and chroma samples representative of the SDR content. The decoding is for example compliant with the HEVC video coding standard.

A luma reshaping step 321 can be applied to convert the full-resolution luminance component Y into a non-linear standard perceptual space:

$$Y_{TF}=TF\circ g^{-1}(Y,Ba)=Y_{C,PQ}=PQ\circ g^{-1}(Y_r,Ba)=LUT(Y)$$

where Y is the luma value provided by the video (HEVC) decoder, $Y_r$ is equal to Y because the optional luminance sample correction step is removed on FIG. 3, and $g^{-1}(Y_r,Ba)$ is the inverse of the non-linearity that was applied on the luminance on the encoder side. In this embodiment, there is no need to apply a preliminary luminance sample correction.

In step 33, a co-located luminance sample in the non-linear domain, $Y_{PQ,col}$, is obtained for each chroma sample. Such step aims at determining a luminance sample ($Y_{PQ,col}$) associated with a chroma sample position in a common space.

A chroma reshaping step 322, or color conversion, can be applied to the linear component U and V:

$$\begin{pmatrix} U_r \\ V_r \end{pmatrix} = \begin{pmatrix} LUT_U(Y_{PQ,col})*(U+\alpha) \\ LUT_V(Y_{PQ,col})*(V+\alpha) \end{pmatrix}$$

Such step aims at applying the determined luminance sample ($Y_{PQ,col}$) in a process that depends on luminance that is being applied to the chroma sample.

An optional step 323 can be applied to the reshaped linear component $U_r$ and $V_r$, in order to improve the color contrast. Such step can implement a filtering of the CPCE type ("Colour-Preserving Contrast Enhancement").

In step 34, a chroma correction is applied on the two reshaped linear component $U_r$ and $V_r$, possibly after CPCE filtering. The chroma correction step 34 outputs the chroma components $Cb_{C,PQ}$, $Cr_{C,PQ}$ computed from non-linear (R,G,B) color samples obtained through a standard ST2084 transfer function TF=PQ, defined such as:

$$S = \sqrt{1 - c_1 \cdot U_r^2 - c_2 \cdot V_r^2 - c_3 \cdot U_r \cdot V_r}$$

$$\begin{bmatrix} R_1 \\ G_1 \\ B_1 \end{bmatrix} = M_{YUV\ to\ RGB} \begin{bmatrix} S \\ U_r \\ V_r \end{bmatrix}$$

$$\begin{bmatrix} R_2 \\ G_2 \\ B_2 \end{bmatrix} = PQ^{-1}(Y_{PQ,col}) \cdot \begin{bmatrix} R_1^2 \\ G_1^2 \\ B_1^2 \end{bmatrix}$$

$$Cb_{C,PQ} = \begin{cases} \dfrac{PQ(B_2) - Y_{PQ,col}}{-2N_B}, & \text{if } PQ(B_2) \leq Y_{PQ,col} \\ \dfrac{PQ(B_2) - Y_{PQ,col}}{2P_B}, & \text{otherwise} \end{cases}$$

$$Cr_{C,PQ} = \begin{cases} \dfrac{PQ(R_2) - Y_{PQ,col}}{-2N_R}, & \text{if } PQ(B_2) \leq Y_{PQ,col} \\ \dfrac{PQ(R_2) - Y_{PQ,col}}{2P_R}, & \text{otherwise} \end{cases}$$

with:
$M_{YUVtoRGB}$: a conversion matrix from the YUV color space to the RGB color space,
$c_1$, $c_2$, $c_3$: three constants, and
$P_B=0.7910$, $N_B=-0.9702$, $P_R=0.4969$, $N_R=-0.8591$.

Chroma upsampling 35 from the format 4:2:0 to 4:4:4 is then applied to the components $Y_{C,PQ}, Cb_{C,PQ}, Cr_{C,PQ}$ represented with the help of the standard transfer function TF=PQ.

The remaining operations performed after the chroma up-sampling 35 are similar to the ones described in relation to FIG. 2:

Matrix color conversion 36 and inverse transfer step 37:
These steps enable the retrieval of the non-linear $R_{PQ}$ and $B_{PQ}$ component samples of the non-linear RGB color space, by applying the inverse of the $Cb_{C,PQ}$ and $Cr_{C,PQ}$ component computation, i.e. the inverse formulas for YCbCr constant luminance BT2020 color space.

The outputs of the matrix color conversion step 36 are the components $Y_{PQ}, R_{PQ}, B_{PQ}$, and the outputs of the inverse transfer step 37 are Y,R,B, such as:

$$\begin{bmatrix} Y \\ R \\ B \end{bmatrix} = PQ^{-1}\left(\begin{bmatrix} Y_{PQ} \\ R_{PQ} \\ B_{PQ} \end{bmatrix}\right)$$

Final Matrix Color Conversion step 38:
This step enables the retrieval of the linear G component as a function of linear-light luminance Y, linear-light R and linear-light B, according to their relationship defined in the ITU-R BT2020 specification:

$$G = Y - (0.2627R + 0.0593B)/0.6780.$$

The matrix color conversion 36, inverse transfer step 37 and final matrix color conversion 38, implemented after the chroma up-sampling 35, are standard and known. A device that implement the ITIU-R BT2020 standard format and the PQ transfer function is able to apply them. The knowledge that the decoded signal lies in this color space is obtained through the VUI message contained in the HEVC bitstream, which indicates the use of the YCbCr constant luminance BT2020 color space, with the standard ST2084 transfer function. As a consequence, there is no need to define a specific SEI message.

The output is at least one linear RGB HDR sample.

The decoder illustrated in FIG. 3 is able to decode a signal coded with the encoder of FIG. 4, if the same transfer function and color space are used.

Referring to FIG. 4, if we consider that the encoder performs color down-sampling in the YCbCr constant luminance BT2020 color space, computed based on non-linear (R,G,B) color samples obtained through the PQ transfer function, the encoding method implements the following steps, for at least one linear-light HDR (R,G,B) sample.

In step 41, the linear-light HDR (R,G,B) sample is converted into a non-linear perceptual space:

$$\begin{bmatrix} R_{PQ} \\ G_{PQ} \\ B_{PQ} \end{bmatrix} = TF\left(\begin{bmatrix} R \\ G \\ B \end{bmatrix}\right) = PQ\begin{bmatrix} R \\ G \\ B \end{bmatrix}.$$

In step 42, the linear-light luminance value $Y_{lin}$ of current pixel is determined from the linear-light HDR (R,G,B) sample:

$$Y_{lin} = Mat_{3\times 3} \cdot \begin{bmatrix} R \\ G \\ B \end{bmatrix}$$

In step 43, the linear-light luminance value $Y_{lin}$ is converted into a non-linear perceptual space, to obtain the full-resolution non-linear luminance component $Y_{C,PQ}$:

$$Y_{C,PQ} = TF(Y_{lin}) = PQ(Y_{lin})$$

and in step 44, a co-located luminance sample in non-linear domain, $Y_{PQ,col}$, is obtained for each chroma sample. Such step aims at determining a luminance sample ($Y_{PQ,col}$) associated with a chroma sample position in a common space.

In step 45, the chroma components Cb and Cr in the non-linear domain are computed from the non linear values $Y_{c,PQ}$, $R_{PQ}$ and $B_{PQ}$. Such computation is for example specified in ITU-R BT2020 specification (Recommendation ITU-R BT.2020-1 (06/2014), Parameter values for ultra-high definition, television systems for production and international program exchange, BT Series Broadcasting service (television)):

$$Cb_{C,PQ} = \begin{cases} \dfrac{PQ(B_2) - Y_{C,PQ}}{2N_B}, & -N_B \leq PQ(B_2) - Y_{C,PQ} \leq 0 \\ \dfrac{PQ(B_2) - Y_{C,PQ}}{2P_B}, & 0 < PQ(B_2) - Y_{C,PQ} \leq P_B \end{cases}$$

$$Cr_{C,PQ} = \begin{cases} \dfrac{PQ(R_2) - Y_{C,PQ}}{2N_R}, & -N_R \leq PQ(R_2) - Y_{C,PQ} \leq 0 \\ \dfrac{PQ(R_2) - Y_{C,PQ}}{2P_R}, & 0 < PQ(R_2) - Y_{C,PQ} \leq P_R \end{cases}$$

In step 46, the chroma components $Cb_{C,PQ}$ and $Cr_{C,PQ}$ are down-sampled to $Cb_{C,PQ,down}$ and $Cr_{C,PQ,down}$.

In step 47, the co-located luminance sample and the down-sampled chroma components ($Y_{PQ,col}$, $Cb_{C,PQ,down}$, $Cr_{C,PQ,down}$) are converted into non-linear RGB component samples ($R_{PQ,down}$, $G_{PQ,down}$, $B_{PQ,down}$), according to ITU-R BT2020 specification.

($R_{PQ,down}$, $G_{PQ,down}$, $B_{PQ,down}$) color components thus have half resolution compared to the input HDR picture.

In step 48, ($R_{PQ,down}$, $G_{PQ,down}$, $B_{PQ,down}$) color components are converted into linear perceptual space, by applying an inverse function $TF^{-1}=PQ^{-1}$, for example the EOTF function, and then undergo a non-linear function that is close to the ITU-R BT709 recommendation, aiming at backward compatible SDR representation of the input HDR signal $$\begin{pmatrix} R'_{PQ,down} \\ G'_{PQ,down} \\ B'_{PQ,down} \end{pmatrix} = \begin{pmatrix} \sqrt{R_{PQ,down}} \\ \sqrt{G_{PQ,down}} \\ \sqrt{B_{PQ,down}} \end{pmatrix}$$

In step 49, the linear color components ($R'_{PQ,down}$, $G'_{PQ,down}$, $B'_{PQ,down}$) are converted into linear YUV component samples, through the matrix-based BT709 RGB to YUV conversion:

$$\begin{pmatrix} U_r \\ V_r \end{pmatrix} = Mat_{3\times 3} \begin{pmatrix} R'_{PQ,down} \\ G'_{PQ,down} \\ B'_{PQ,down} \end{pmatrix}$$

An optional step 491 can be applied to the linear component $U_r$ and $V_r$, in order to improve the color contrast. Such step can implement a filtering of the CPCE type ("colour-Preserving Contrast Enhancement").

In addition, a chroma reshaping step 492, or color conversion, can be applied to the linear component $U_r$ and $V_r$:

$$\begin{pmatrix} U \\ V \end{pmatrix} = \begin{pmatrix} U_r/LUT_U(Y_{PQ,col}) - \alpha \\ V_r/LUT_V(Y_{PQ,col}) - \alpha \end{pmatrix} = \begin{pmatrix} U_r \\ V_r \end{pmatrix} / \beta_0$$

Such step applies the determined luminance sample ($Y_{PQ,col}$) in a process that depends on luminance that is being applied to the chroma sample. Its goal to is produce SDR mapped color component that preserves the perceived colors of the input HDR signal, once the signal is mapped to the target SDR color space.

A luma reshaping step 493 can also be applied to the full-resolution non-linear luminance component $Y_{C,PQ}$:

$Y_C$=luminanceToneMapping($PQ^{-1}(Y_{C,PQ})$)

$Y_C$=$g(PQ^{-1}(Y_{C,PQ}),Ba)$

This step provides the luma component that is going to be encoded by an encoder 494, like a standard HEVC encoder.

Such chroma reshaping step and luma reshaping step are described in more details in the internal patent application PCT/EP16/051449 filed on Jan. 25, 2016.

According to the encoder illustrated in FIG. 4, the chroma down-sampling is done before the dynamic range reduction steps applied on the luminance and color components. The color down-sampling can thus be done in the same domain as the chroma up-sampling performed on the decoder side, improving the HDR compression efficiency of the whole HDR video coding/decoding chain.

Figure 1:
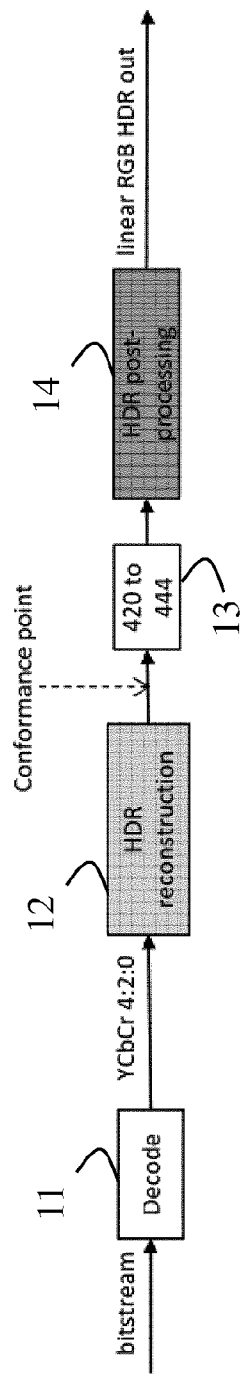
FIG. 1 depicts a block diagram showing an decoding workflow and conformance point according to prior art.
Figure 5:
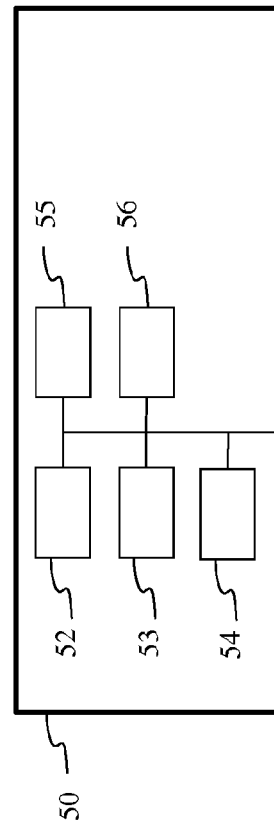
FIG. 5 shows an example of an architecture of a device in accordance with an example of present principles; and In FIGS. 1-4, the represented blocks are purely functional entities, which do not necessarily correspond to physically separate entities. Namely, they could be developed in the form of software, hardware, or be implemented in one or several integrated circuits, comprising one or more processors.

FIG. 5 represents an exemplary architecture of a device 50 which may be configured to implement a method described in relation with FIG. 1-4.

Device 50 comprises following elements that are linked together by a data and address bus 51:
- a microprocessor 52 (or CPU), which is, for example, a DSP (or Digital Signal Processor);
- a ROM (or Read Only Memory) 53;
- a RAM (or Random Access Memory) 54;
- an I/O interface 55 for reception of data to transmit, from an application; and
- a battery 56

In accordance with an example, the battery 56 is external to the device. In each of mentioned memory, the word «register» used in the specification can correspond to area of small capacity (some bits) or to very large area (e.g. a whole program or large amount of received or decoded data). The ROM 53 comprises at least a program and parameters. The ROM 53 may store algorithms and instructions to perform techniques in accordance with present principles. When switched on, the CPU 52 uploads the program in the RAM and executes the corresponding instructions.

RAM 54 comprises, in a register, the program executed by the CPU 52 and uploaded after switch on of the device 50, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of decoding or decoder, the decoded 4:2:0 pictures are obtained from a source. For example, the source belongs to a set comprising:
- a local memory (53 or 54), e.g. a video memory or a RAM (or Random Access Memory), a flash memory, a ROM (or Read Only Memory), a hard disk;
- a storage interface (55), e.g. an interface with a mass storage, a RAM, a flash memory, a ROM, an optical disc or a magnetic support;
- a communication interface (55), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the decoding or a decoder, the reconstructed picture represented in a color space such as the CIE XYZ color or the RGB color space are sent to a destination; specifically, the destination belongs to a set comprising:
- a local memory (53 or 54), e.g. a video memory or a RAM, a flash memory, a hard disk;
- a storage interface (55), e.g. an interface with a mass storage, a RAM, a flash memory, a ROM, an optical disc or a magnetic support;
- a communication interface (55), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of decoding or decoder, a bitstream carrying the decoded 4:2:0 pictures is obtained from a source. Exemplarily, the bitstream is read from a local memory, e.g. a video memory (54), a RAM (54), a ROM (53), a flash memory (53) or a hard disk (53). In a variant, the bitstream is received from a storage interface (55), e.g. an interface with a mass storage, a RAM, a ROM, a flash memory, an optical disc or a magnetic support and/or received from a communication interface (55), e.g. an interface to a point to point link, a bus, a point to multipoint link or a broadcast network.

In accordance with examples, device 60 being configured to implement a decoding method described in relation with FIG. 5, belongs to a set comprising:
- a mobile device;
- a communication device;
- a game device;
- a set top box;
- a TV set;
- a tablet (or tablet computer);
- a laptop;
- a display and
- a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for reconstructing an HDR picture from reconstructed luma and chroma samples, comprising:
- decoding luminance and chrominance samples representative of a SDR picture in a color space in which two chroma components have a spatial size that is half the size of a luminance component in width and/or in height, said SDR picture being a lower dynamic range depiction of said HDR picture;
- determining a co-located luminance sample value for chrominance samples according to the spatial positions of said chrominance samples;

obtaining said reconstructed chroma samples by correcting the chrominance samples from said co-located luminance sample value; and obtaining said reconstructed luma samples from said luminance samples.

2. The method of claim 1, wherein obtaining a reconstructed luma sample from a luminance sample comprises:

determining a co-located chrominance sample values associated with said luminance sample according to the spatial position of said luminance sample; and said reconstructed luma component is then a weighted linear combination of said luminance sample and said co-located chrominance sample values.

3. The method of claim 1, wherein the color space comprises a non-linear luminance obtained when applying a standard transfer function.

4. The method of claim 3, wherein the standard transfer function comprises a SMPTE ST2084 inverse electro-optical transfer function (EOTF).

5. The method of claim 1, wherein determining a co-located luminance sample value comprises calculating an average value of the chrominance samples located at said spatial positions.

6. A device for reconstructing an HDR picture from reconstructed luma and chroma samples, comprising a processor configured to:

decode luminance and chrominance samples representative of a SDR picture in a color space in which two chroma components have a spatial size that is half the size of a luminance component in width and/or in height, said SDR picture being a lower dynamic range depiction of said HDR picture;

determine a co-located luminance sample value for chrominance samples according to the spatial positions of said chrominance samples;

obtain said reconstructed chroma samples by correcting the chrominance samples from said co-located luminance sample value; and obtain said reconstructed luma samples from said luminance samples.

7. The device of claim 6, wherein obtaining a reconstructed luma sample from a luminance sample comprises:

determining a co-located chrominance sample values associated with said luminance sample according to the spatial position of said luminance sample; and said reconstructed luma component is then a weighted linear combination of said luminance sample and said co-located chrominance sample values.

8. The device of claim 6, wherein the color space comprises a non-linear luminance obtained when applying a standard transfer function.

9. The device of claim 8, wherein the standard transfer function comprises a SMPTE ST2084 inverse electro-optical transfer function (EOTF).

10. The device of claim 6, wherein determining a co-located luminance sample value comprises calculating an average value of the chrominance samples located at said spatial positions.

11. A computer readable medium for storing instructions which, when executed by a computer, cause the computer to execute the following actions:

decode luminance and chrominance samples representative of a SDR picture in a color space in which two chroma components have a spatial size that is half the size of a luminance component in width and/or in height, said SDR picture being a lower dynamic range depiction of said HDR picture;

determine a co-located luminance sample value for chrominance samples according to the spatial positions of said chrominance samples;

obtain said reconstructed chroma samples by correcting the chrominance samples from said co-located luminance sample value; and obtain said reconstructed luma samples from said luminance samples.

* * * * *

UNITED STATES PATENT AND TRADEMARK OFFICE
CERTIFICATE OF CORRECTION

PATENT NO. : 10,721,484 B2
APPLICATION NO. : 15/761100
DATED : July 21, 2020
INVENTOR(S) : Fabrice Le Leannec et al.

It is certified that error appears in the above-identified patent and that said Letters Patent is hereby corrected as shown below:

On the Title Page

Item (56) under OTHER PUBLICATIONS, first Line: replace "ssoftware" with --software--

Signed and Sealed this
Fifteenth Day of November, 2022

Katherine Kelly Vidal
Director of the United States Patent and Trademark Office